US010158571B2

(12) United States Patent
Goel et al.

(10) Patent No.: US 10,158,571 B2
(45) Date of Patent: *Dec. 18, 2018

(54) TWO STAGE BLOOM FILTER FOR LONGEST PREFIX MATCH

(71) Applicant: Juniper Networks, Inc., Sunnyvale, CA (US)

(72) Inventors: Deepak Goel, San Jose, CA (US); Mugdha G. Patil, Fremont, CA (US); Paul Kim, Fremont, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 15 days.

This patent is subject to a terminal disclaimer.

(21) Appl. No.: 15/454,658

(22) Filed: Mar. 9, 2017

(65) Prior Publication Data
US 2017/0187624 A1    Jun. 29, 2017

Related U.S. Application Data

(63) Continuation of application No. 14/518,400, filed on Oct. 20, 2014, now Pat. No. 9,596,181.

(51) Int. Cl.
| H04L 9/08 | (2006.01) |
| H04L 12/745 | (2013.01) |
| H04L 12/743 | (2013.01) |
| H04L 12/26 | (2006.01) |
| H04L 12/741 | (2013.01) |

(52) U.S. Cl.
CPC .......... H04L 45/748 (2013.01); H04L 9/0836 (2013.01); H04L 43/12 (2013.01); H04L 45/54 (2013.01); H04L 45/7453 (2013.01)

(58) Field of Classification Search
None
See application file for complete search history.

(56) References Cited

U.S. PATENT DOCUMENTS

| 6,449,256 B1 | 9/2002 | Varghese et al. |
| 9,596,181 B1 | 3/2017 | Goel et al. |

(Continued)

OTHER PUBLICATIONS

Zhou B. et al "An Efficient Data Fingerprint Query Algorithm Based on Two-Leveled Bloom Filter" pp. 73-81, Journal of Multimedia, vol. 8, No. 2, Apr. 2013.*

(Continued)

*Primary Examiner* — Xavier Szewai Wong
(74) *Attorney, Agent, or Firm* — Harrity & Harrity, LLP (57) ABSTRACT

A device may receive a packet that includes a destination address. The device may analyze a first Bloom filter, based on the destination address, in order to identify a prefix range entry associated with the destination address and included in a set of prefix range entries associated with the first Bloom filter. The device may analyze a second Bloom filter, based on the destination address and the identified prefix range entry, in order to identify a prefix length entry associated with the destination address and included in a set of prefix length entries associated with the second Bloom filter. The device may determine routing information associated with the identified prefix length entry. The routing information may identify a longest prefix match associated with the destination address. The device may provide the packet based on the routing information.

20 Claims, 8 Drawing Sheets

(56) References Cited

U.S. PATENT DOCUMENTS

| | | | |
|---|---|---|---|
| 2004/0013113 A1 | 1/2004 | Singh et al. | |
| 2004/0215609 A1* | 10/2004 | Takatsu | H04L 45/00 |
| 2005/0174272 A1 | 8/2005 | Cadambi et al. | |
| 2005/0175010 A1* | 8/2005 | Wilson | H04L 12/4625 370/392 |
| 2005/0195832 A1 | 9/2005 | Dharmapurikar et al. | |
| 2007/0115986 A1* | 5/2007 | Shankara | H04L 63/145 370/392 |
| 2007/0248084 A1* | 10/2007 | Whitehead | H04L 63/1466 370/389 |
| 2010/0023727 A1* | 1/2010 | Lim | H04L 45/745 711/216 |
| 2010/0040066 A1 | 2/2010 | Hao et al. | |
| 2010/0040067 A1 | 2/2010 | Hao et al. | |
| 2012/0084459 A1* | 4/2012 | Wu | H04L 45/7453 709/238 |
| 2013/0242996 A1* | 9/2013 | Varvello | H04L 67/327 370/392 |
| 2013/0246651 A1* | 9/2013 | Keen | H04L 45/7453 709/238 |
| 2014/0036918 A1 | 2/2014 | Varvello et al. | |
| 2014/0036925 A1* | 2/2014 | Hui | H04L 45/14 370/400 |
| 2014/0244779 A1* | 8/2014 | Roitshtein | H04L 45/748 709/213 |

OTHER PUBLICATIONS

Wikipedia, "Bloom Filter," http://en.wikipedia.org/wiki/Bloom_filter, Oct. 15, 2014, 17 pages.
Cao, "Bloom Filters—the Math," http://pages.cs.wisc.edu/~cao/papers/summary-cache/node8.html, Jul. 5, 1998, 6 pages.
Davies, "Bloom Filters," http://www.jasondavies.com/bloomfilter/, Dec. 8, 2011, 2 pages.
Cisco, "IP Addressing and Subnetting for New Users," http://www.cisco.com/c/en/us/support/docs/ip/routing-information-protocol-rip/13788-3.html, Sep. 26, 2005, 8 pages.
Wikipedia, "Longest Prefix Match," http://en.wikipedia.org/wiki/Longest_prefix_match, Oct. 16, 2014, 1 page.
Wang et al. IEEE publication: NameFilter: Achieving fast name lookup with low memory cost via applying two-stage Bloom filters, 2013, 5 pages.

* cited by examiner

TWO STAGE BLOOM FILTER FOR LONGEST PREFIX MATCH

RELATED APPLICATION

This application is a continuation of U.S. patent application Ser. No. 14/518,400, filed Oct. 20, 2014 (now U.S. Pat. No. 9,596,181), the disclosure of which is incorporated herein by reference.

BACKGROUND

Longest prefix match may refer to an algorithm that is used by a network device to select an entry from a routing table associated with routing a packet. In some cases, a destination address, associated with the packet, may match one or more routing table entries. The most specific of the matching routing table entries (i.e., the entry with the highest subnet mask) is called the longest prefix match (e.g., since the most specific routing table entry is the routing table entry where the largest number of leading address bits of the destination address match those bits in the routing table entry).

SUMMARY

According to some possible implementations, a device may comprise one or more processors to receive a packet that includes a destination address; analyze a first Bloom filter, based on the destination address, in order to identify a prefix range entry, where the first Bloom filter may include a set of prefix range entries, and where the prefix range entry may be associated with the destination address and being included in the set of prefix range entries; analyze a second Bloom filter, based on the destination address and the identified prefix range entry, in order to identify a prefix length entry, where the second Bloom filter may include a set of prefix length entries, and where the prefix length entry may be associated with the destination address and being included in the set of prefix length entries; determine routing information associated with the identified prefix length entry, where the routing information may identify a longest prefix match associated with the destination address; and provide the packet based on the routing information.

According to some possible implementations, a computer-readable medium may store one or more instructions that, when executed by one or more processors, cause the one or more processors to: receive a packet including a destination address; search a prefix range Bloom filter, based on the destination address, in order to identify a prefix range entry, where the prefix range Bloom filter may include a set of prefix range entries, and where the prefix range entry may be associated with the destination address and being included in the set of prefix range entries; search a prefix length Bloom filter, based on the destination address and the identified prefix range entry, in order to identify a prefix length entry, where the prefix length Bloom filter may include a set of prefix length entries, and where the prefix length entry may be associated with the destination address and being included in the set of prefix length entries; determine routing information associated with the identified prefix length entry, where the routing information may identify a longest prefix match associated with the destination address; and provide the packet based on the routing information.

According to some possible implementations, a method may include: receiving, by a device, a packet that includes a destination address; probing, by the device and based on the destination address, a first filter in order to identify a prefix range entry, where the first filter may include a set of prefix range entries, and where the prefix range entry may be associated with the destination address and being included in the set of prefix range entries; probing, by the device and based on the destination address and the identified prefix range entry, a second filter in order to identify a prefix length entry, where the second filter may include a set of prefix length entries, and where the prefix length entry may be associated with the destination address and being included in the set of prefix length entries; determining, by the device, routing information associated with the identified prefix length entry, where the routing information may identify a longest prefix match associated with the destination address; and transmitting, by the device, the packet based on the routing information.

DETAILED DESCRIPTION

The following detailed description of example implementations refers to the accompanying drawings. The same reference numbers in different drawings may identify the same or similar elements.

Longest prefix match refers to an algorithm that is used by a network device to select a routing table entry from a routing table associated with routing a packet. The algorithm is designed to determine a longest (e.g., a most specific) routing table entry for a destination address associated with the packet. Each routing table entry may include a network address and a prefix length that identifies the most significant valid bits of the network address. When looking up a network address in the routing table, there can be multiple matches for the destination address, however, the routing table entry of interest is the routing table entry that is a closest match to the destination address associated with the packet (i.e., the routing table entry with the longest prefix match). Numerous schemes for implementing the longest prefix match algorithm exist, such as a hash based lookup, a tree based implementation, a cache based approach, and the like.

In a hash based lookup implementation, a lookup algorithm (e.g., the Alpha algorithm) may implement the routing table as a hash table. Here, each hash table entry may contain a network address and a prefix length (e.g., that identifies a subnet mask associated with the network address) as key material. The lookup algorithm may start probing the hash table with a longest possible prefix length and may then iterate with subsequently smaller prefix lengths for each subsequent hash table probe until a match is found in the hash table. An enhancement over this implementation may be achieved through addition of a Bloom filter.

A Bloom filter is a probabilistic data structure used to check for the existence of an element in a set. False positives are possible, but false negatives are not. A properly sized Bloom filter with an appropriate number of hash functions may allow for a low false positive rate (e.g., approximately 2% or less). For each hash table entry, an entry is created in the Bloom filter. The lookup algorithm may probe the Bloom filter for all prefix lengths of interest and check the hash table iteratively starting with the longest prefix length found in the Bloom filter. This approach may reduce a load on the hash table by requiring fewer probes of the hash table in order to identify the network address with the longest prefix match. Similarly, this approach may also increase a speed at which a matched is identified in the hash table.

With Internet Protocol version 6 (IPv6) addressing gaining traction, a prefix length space, associated with a network address for a packet, may increase from 32 bits (e.g., associated with Internet Protocol version 4 (IPv4) addresses) to 128 bits. As such, performing a lookup for a relatively long (e.g., 128 bit) network address may reduce lookup performance (e.g., since a greater number of probes of the Bloom filter may be needed). What is needed is a solution that provides improved lookup performance for network addresses. Implementations described herein may allow a network device to identify a longest prefix match, associated with a network address, using a two-stage Bloom filter for improved lookup performance.

Figure 1:
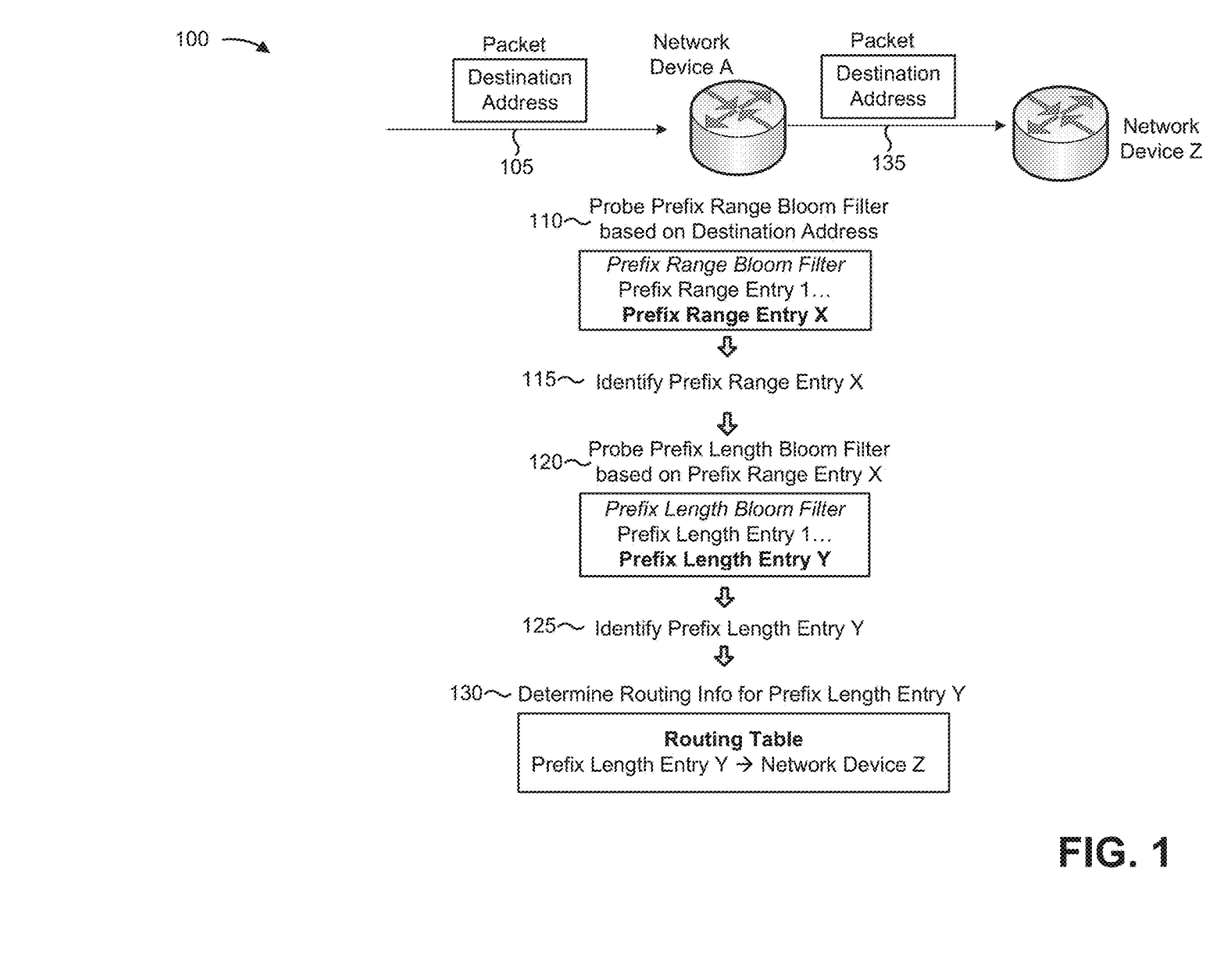
FIG. 1 is a diagram of an overview of an example implementation described herein.

FIG. 1 is a diagram of an overview of an example implementation 100 described herein. For the purposes of example implementation 100, assume that a network device network device A) stores a routing table associated with routing packets received by network device A. Further, assume that network device A stores information associated with a prefix range Bloom filter and information associated with a prefix length Bloom filter that may be used in conjunction with the routing table to identify (e.g., based on a destination address included in a packet) a longest prefix match network address that identifies a device to which the packet is to be provided.

As shown in FIG. 1, and by reference number 105, network device A may receive a packet that includes a destination address to which the packet is to be provided. As shown by reference number 110, network device A may probe the prefix range Bloom filter based on the destination address and, as shown by reference number 115, may identify a prefix range entry with a longest prefix (e.g., prefix range entry X), included in the prefix range Bloom filter that includes the destination address. As shown by reference number 120, network device A may then probe the prefix length Bloom filter (e.g., based on the destination address and prefix range entry X) and, as shown by reference number 125, may identify a prefix length entry with a longest prefix (e.g., prefix length entry Y), included in the prefix length Bloom filter, that includes the destination address. Notably, network device A may probe the prefix length Bloom filter for only those entries corresponding to prefix range entry X (e.g., such that network device A need not probe for prefix length entries that are not associated with prefix range entry X).

As shown by reference number 130, network device A may determine, based on prefix length entry Y, routing information included in the routing table. The routing information, associated with prefix length entry Y, may identify a longest prefix match network address associated with the destination address. As shown, the routing information may indicate that the packet is to be provided to a particular network device (e.g., network device Z) and, as shown by reference number 135, network device A may provide the packet to network device Z. In this way, a network device may identify a longest prefix match, associated with a destination address included in a packet, using a two-stage Bloom filter such that lookup performance, associated with identifying another device to which the packet is to be provided, is improved and/or efficiently uses computing resources (e.g., by performing fewer iterations on the prefix length Bloom filter, by reducing load on a routing table, etc.).

Figure 2:
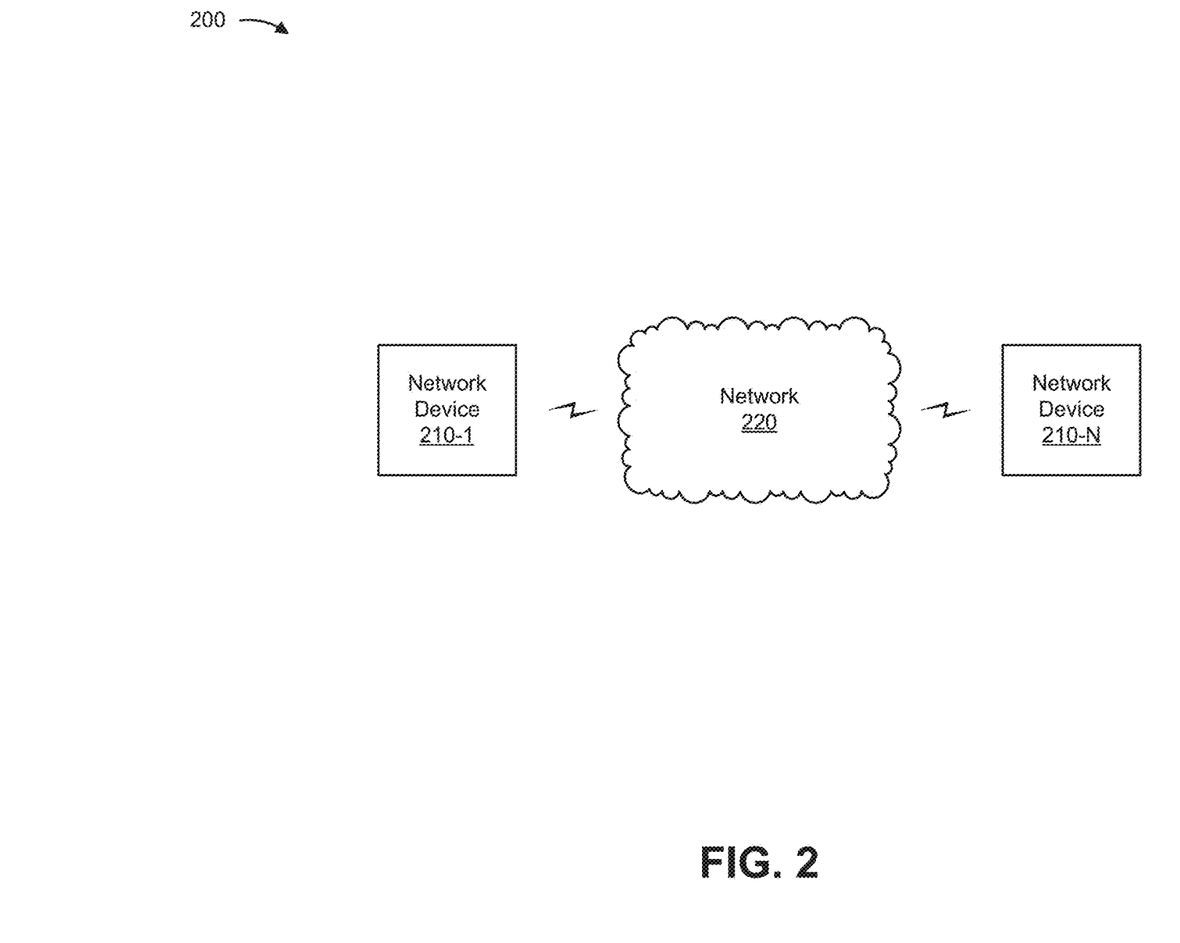
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-N (N≥1) (hereinafter referred to collectively as network devices 210, and individually as network device 210) and a network 220. Devices of environment 200 may interconnect via wired connections, wireless connections, or a combination of wired and wireless connections.

Network device 210 may include a device capable of receiving, transmitting, processing, routing, etc. packets travelling via network 220. For example, network device 210 may include a router, a switch, a gateway, a modem, a firewall, a network interface controller (NIC), a hub, a bridge, an optical add-drop multiplexer (OADM), or another type of network device. In some implementations, network device 210 may include one or more input ports associated with receiving packets and one or more output ports associated with transmitting packets. In some implementations, network device 210 may be connected to one or more other network devices 210. In some implementations, network device 210 may communicate with other devices (not shown) in order to process and/or route packets received by network device 210.

Network 220 may include one or more wired and/or wireless networks that include network devices 210 and/or allow network devices 210 to communicate. For example, network 220 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
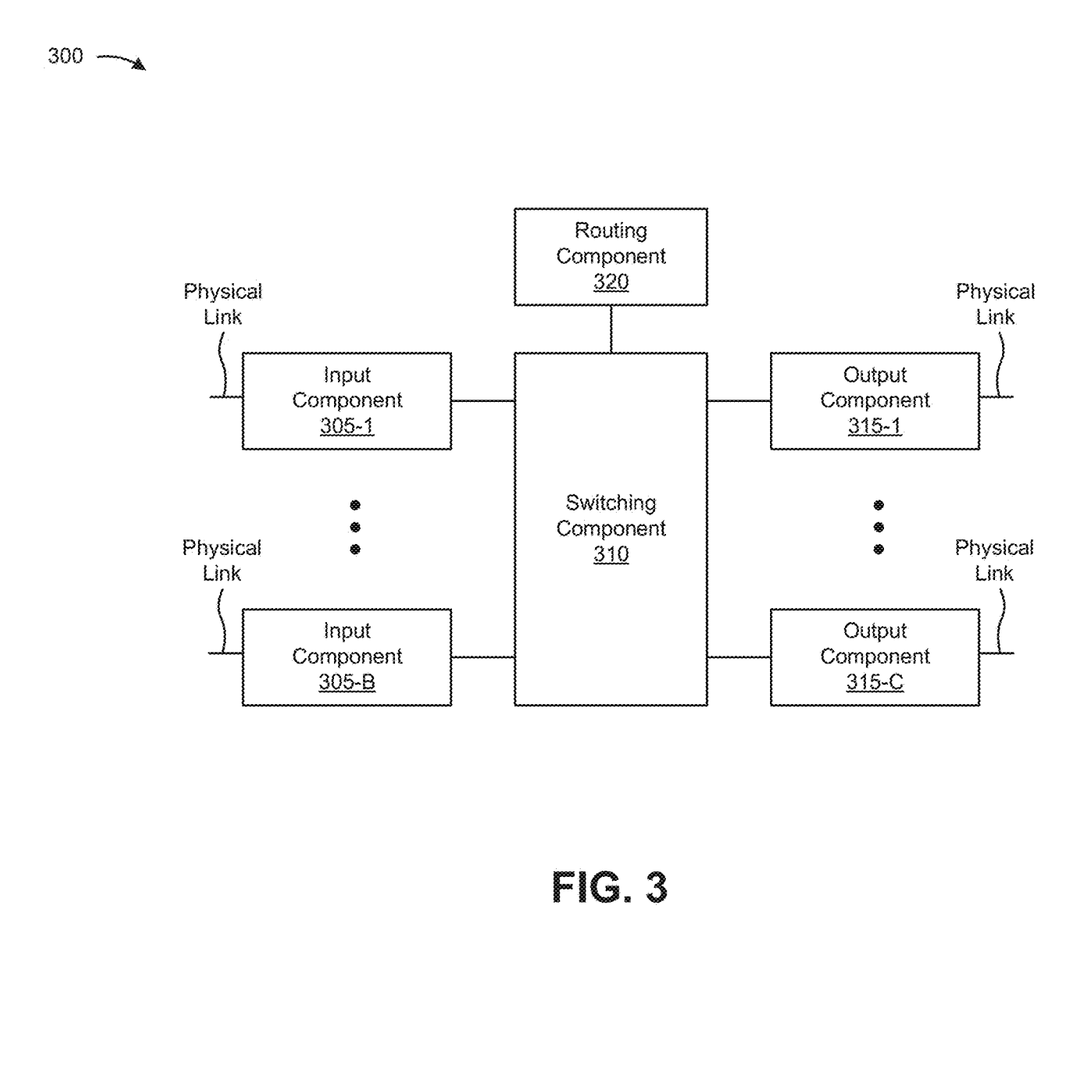
FIG. 3 is a diagram of example components of one or more devices of FIG. 2.

FIG. 3 is a diagram of example components of a network device 210. As shown in FIG. 3, network device 210 may include one or more input components 305-1 through 305-B (B≥1) (hereinafter referred to collectively as input components 305, and individually as input component 305), a switching component 310, one or more output components 315-1 through 315-C (C≥1) (hereinafter referred to collectively as output components 315, and individually as output component 315), and a routing component 320.

Input component 305 may be points of attachment for physical links and may be points of entry for incoming traffic, such as packets. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues. In some implementations, network device 210 may include one or more input components 305.

Switching component 310 may interconnect input components 305 with output components 315. In some implementations, switching component 310 may be implemented via one or more crossbars, via busses, and/or with shared memories. The shared memories may act as temporary buffers to store packets from input components 305 before the packets are eventually scheduled for delivery to output components 315. In some implementations, switching component 310 may enable input components 305, output components 315, and/or routing component 320 to communicate.

Output component 315 may store packets and may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, network device 210 may include one or more output components 315. In some implementations, input component 305 and output component 315 may be implemented by the same set of components (e.g., and input/output component may be a combination of input component 305 and output component 315).

Routing component 320 may include one or more processors, microprocessors, application-specific integrated circuits (ASICs), field programmable gate arrays (FPGAs), or similar types of processing components. In some implementations, routing component 320 may communicate with other devices, networks, and/or systems connected to network device 210 to exchange information regarding network topology. Routing component 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming and/or outgoing packets.

The number and arrangement of components shown in FIG. 3 are provided as an example. In practice, network device 210 may include additional components, fewer components, different components, or differently arranged components than those shown in FIG. 3. Additionally, or alternatively, a set of components (e.g., one or more components) of network device 210 may perform one or more functions described as being performed by another set of components of network device 210.

Figure 4:
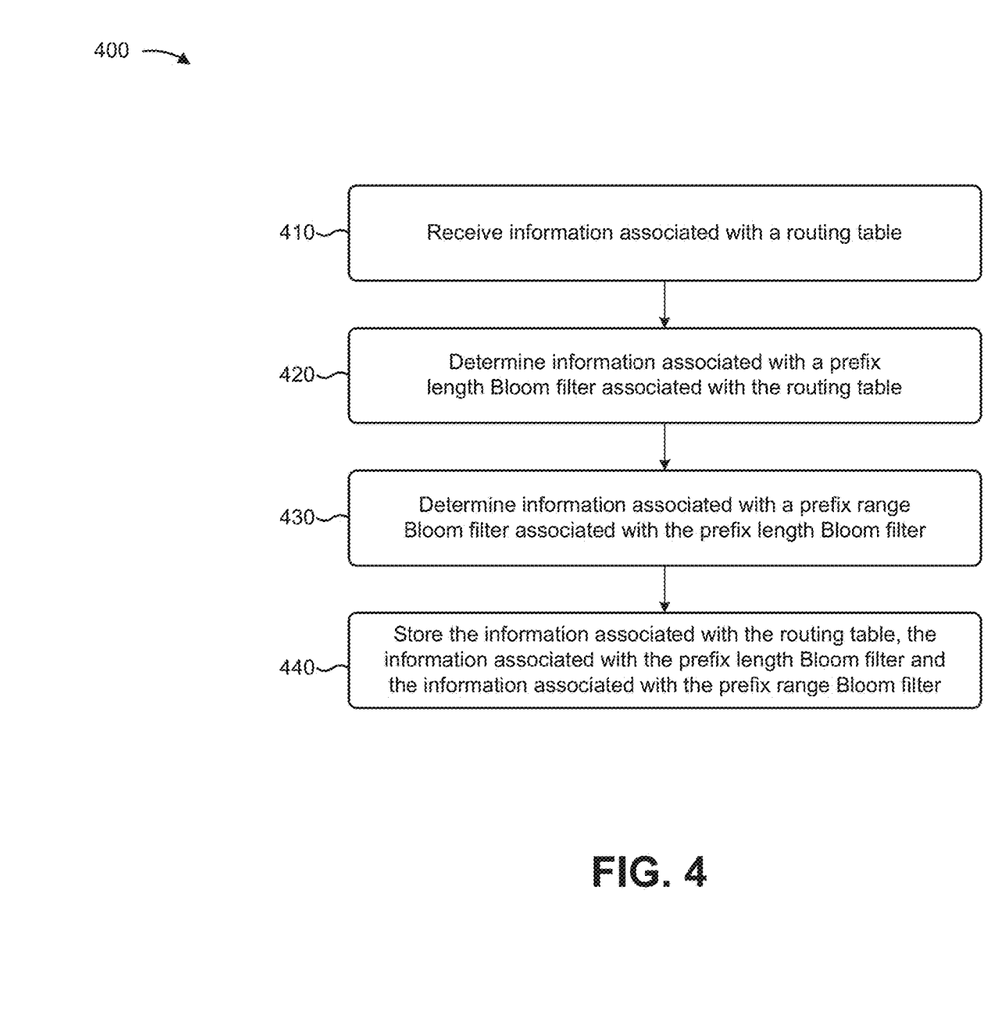
FIG. 4 is a flow chart of an example process for receiving and storing information associated with a routing table, information associated with a prefix length Bloom filter, and information associated with a prefix range Bloom filter.

FIG. 4 is a flow chart of an example process 400 for receiving and storing information associated with a routing table, information associated with a prefix length Bloom filter, and information associated with a prefix range Bloom filter. In some implementations, one or more process blocks of FIG. 4 may be performed by network device 210.

As shown in FIG. 4, process 400 may include receiving information associated with a routing table (block 410). For example, network device 210 may receive information associated with a routing table (herein referred to as routing table information). In some implementations, network device 210 may receive the routing table information when another device (e.g., another network device 210, a network management device, or the like) provides the routing table information. Additionally, or alternatively, network device 210 may receive the routing table information when a user (e.g., an administrator associated with network device 210) provides the routing table information (e.g., in the form of user input). Additionally, or alternatively, network device 210 may receive the routing table information when network device 210 determines the routing table information (e.g., based on a configuration of network device 210).

A routing table may include a table that includes a set of routing table entries associated with a network route via which a packet may travel with a network and/or to a device associated with a destination network address. For example, the routing table may include information associated with a destination network address (e.g., an IP address, a media access control (MAC) address, etc.), a network address associated with a next device to which a packet is to be provided (e.g., a network device 210 acting as a next hop, a network device 210 acting as a gateway, etc.), information associated with a cost of sending the packet via the network route, or another type of information. In some implementations, the routing table may include information associated with a network topology of network 220 that includes network device 210. Additionally, or alternatively, the routing table may include information associated with one or more static routes (e.g., when one or more routing table entries are created using a non-automatic technique, such as based on user input). Additionally, or alternatively, the routing table may include information associated with one or more dynamic network routes (e.g., when one or more network routes are determined by network device 210 as a result of a network topology discovery procedure). In some implementations, the routing table may include one or more IPv4 network addresses and/or one or more IPv6 network addresses.

In some implementations, network device 210 may receive the routing table information based on user input (e.g., when an administrator, associated with network device 210, provides the routing table information). Additionally, or alternatively, network device 210 may receive the routing table information based on a network topology discovery procedure associated with network device 210. In some implementations, network device 210 may determine updated routing table information (e.g., when network device 210 performs a network topology discover procedure and modifies routing table information received at an earlier time).

As further shown in FIG. 4, process 400 may include determining information associated with a prefix length Bloom filter associated with the routing table (block 420).

For example, network device 210 may determine information associated with a prefix length Bloom filter associated with the routing table (herein referred to as prefix length Bloom filter information). In some implementations, network device 210 may determine the prefix length Bloom filter information after network device 210 determines the routing table information. Additionally, or alternatively, network device 210 may determine the prefix length Bloom filter information when network device 210 receives the prefix length Bloom filter information from another device. Additionally, or alternatively, network device 210 may determine the prefix length Bloom filter information when network device 210 receives information indicating that network device 210 is to determine the prefix length Bloom filter information.

A prefix length Bloom filter may include a Bloom filter that includes a set of prefix length entries that correspond to a set of routing table entries included in a routing table. For example, assume that the routing table includes routing information associated with a set of network addresses. In this case, the prefix length Bloom filter may include a set of prefix length entries that correspond to the set of network addresses identified in the routing table. In some implementations, each prefix length entry may include a network address and prefix information associated with the network address (e.g., 192.24.12.0.0/22, 82.0.0.0/8, 2001:db8:a::123/64 etc.). In some implementations, network device 210 may probe the prefix length Bloom filter in order to identify a routing table entry that includes a longest prefix match network address for a destination address, as described below.

In some implementations, network device 210 may determine the prefix length Bloom filter information based on the routing table information. For example, network device 210 may receive the routing table information, may identify a set of network addresses included in the routing table information, and may determine the prefix length Bloom filter information based on the set of network addresses. In other words, in some implementations, network device 210 may generate the prefix length Bloom filter based on the routing table information.

Additionally, or alternatively, network device 210 may determine the prefix length Bloom filter information based on receiving the prefix length Bloom filter information. For example, a user (e.g., an administrator associated with network device 210) may provide user input that identifies the prefix length Bloom filter information. Additionally, or alternatively, network device 210 may determine the prefix length Bloom filter information in another manner, such as by receiving the prefix length Bloom filter information from another device.

As further shown in FIG. 4, process 400 may include determining information associated with a prefix range Bloom filter associated with the prefix length Bloom filter (block 430). For example, network device 210 may determine information associated with a prefix range Bloom filter associated with the prefix length Bloom filter (herein referred to as prefix range Bloom filter information). In some implementations, network device 210 may determine the prefix range filter information after network device 210 determines the routing table information. Additionally, or alternatively, network device 210 may determine the prefix range filter information after network device 210 determines the prefix length Bloom filter information. Additionally, or alternatively, network device 210 may determine the prefix range filter information when network device 210 receives the prefix range filter information from another device. Additionally, or alternatively, network device 210 may determine the prefix range filter information when network device 210 receives information indicating that network device 210 is to determine the prefix range filter information.

A prefix range Bloom filter may include a Bloom filter that includes a set of prefix range entries associated with a set of prefix length entries included in a prefix length Bloom filter. For example, assume that the prefix length Bloom filter includes the following prefix length entries:

192.168.20.16/28
192.168.48.0/24
192.168.0.0/16
192.24.0.0/18
192.24.12.0/22
82.168.20.16/28
82.168.20.0/24
82.168.0.0/16

In this example, assume that network device 210 is configured to determine prefix range Bloom filter information based on a set of four prefix ranges: /1 to /7, /8 to /15, /16 to /23 (e.g., including /16, /18, and /22), and /24 to /31 (e.g., including /24 and /28). In some implementations, network device 210 may determine a prefix range entry associated with one or more prefix length entries associated with a prefix range. For example, network device 210 may determine a single prefix range entry of 82.168.20.0/24 for prefix length entry 82.168.20.16/28 and prefix length entry 82.168.20.0/24 (e.g., since 82.168.20.0/24 encompasses 82.168.20.16/28 and the /28 prefix is included in the /24 to /31 prefix range). Similarly, network device 210 may determine a single prefix range entry of 192.24.0.0/16 for prefix length entry 192.24.0.0/18 and prefix length entry 192.24.12.12.0/22 (e.g., since 192.24.0.0/16 encompasses 192.24.0.0/18 and prefix length entry 192.24.12.12.0/22 and the /18 prefix and the /22 prefix are included in the /16 to /23 prefix range). In other words, network device may determine a prefix range entry with a lowest prefix associated with a prefix range (e.g., /24 is the lowest prefix in the /24 to /31 prefix range) for multiple prefix length entries encompassed by the prefix range. Here, based on the set of prefix length entries, network device 210 may determine prefix range Bloom filter information that includes the following prefix range entries:

82.168.0.0/16
192.24.0.0/16
192.168.48.0/24
192.168.20.0/24
82.168.20.0/24

Notably, there are no prefix range entries that include the /1 prefix or the /8 prefix (e.g., since no prefix length entry falls within the /1 to /7 prefix range or the /8 to /15 prefix range). As such, network device 210 may not probe the prefix range Bloom filter for a /1 prefix range entry or a /8 prefix range entry (i.e., the /1 prefix range and the /8 prefix range may be disabled). This may allow for targeted probing of the prefix range Bloom filter when network device 210 is configured to probe the prefix range Bloom filter for only enabled prefix ranges). As shown, each prefix range entry may encompass one or more prefix length entries such that the quantity of prefix range entries is less than the quantity of prefix length entries (e.g., the 82.168.20.0/24 prefix range entry encompasses the 82.168.20.0/24 prefix length entry and the 82.168.20.16/28 prefix length entry). While the advantage of employing two Bloom filters may not be obvious in this example, due to clustering of IP prefixes (e.g., when many network addresses are identified in the routing table and the prefix length Bloom filter) the quantity of prefix range entries in the prefix range Bloom Filter may be small (e.g., as compared to the quantity of prefix length entries) and may allow for improved lookup performance.

In some implementations, network device 210 may determine the prefix range Bloom filter information based on the prefix length Bloom filter information and/or the routing table information. For example, network device 210 may receive the routing table information, may identify a set of destination network addresses included in the routing table information, may determine the prefix length Bloom filter information based on the set of destination network addresses, and may then determine the prefix range Bloom filter information based on the prefix length Bloom filter information. In other words, in some implementations, network device 210 may generate the prefix range Bloom filter based on the routing table information and/or the prefix length Bloom filter information.

Additionally, or alternatively, network device 210 may determine the prefix range Bloom filter information based on receiving the prefix range Bloom filter information. For example, a user (e.g., an administrator associated with network device 210) may provide user input that identifies the prefix range Bloom filter information. Additionally, or alternatively, network device 210 may determine the prefix range Bloom filter information in another manner, such as by receiving the prefix range Bloom filter information from another device.

In some implementations, the manner in which network device 210 determines the prefix range Bloom filter information may be configurable (e.g., by an administrator, by network device 210, etc.). For example, network device 210 may store or have access to information that identifies a set of prefix ranges (e.g., as described in the above example), and may determine the prefix range Bloom filter information based on the set of configured prefix ranges. As another example, network device 210 may store or have access to information that identifies a quantity of memory (e.g., a quantity of bits, a percentage of total bits, etc.) to be used to store the prefix range Bloom filter information and/or the prefix length Bloom filter information, and may determine the prefix range Bloom filter information based on the information that identifies the quantity of memory. In some implementations, a user of network device 210 may provide (e.g., in the form of user input) information associated with the configuration of network device 210. In other words, the manner in which network device 210 determines the prefix range information may be configured (e.g., statically) by a user. Additionally, or alternatively, network device 210 may determine (e.g., automatically, dynamically, etc.) information associated with the configuration of network device 210. In other words, the manner in which network device 210 determines the prefix range information may be dynamically configured (e.g., network device 210 may update the configuration as a quantity of routing table entries increases, as a quantity of memory available to store the prefix range Bloom filter changes, etc.).

As further shown in FIG. 4, process 400 may include storing the information associated with the routing table, the information associated with the prefix length Bloom filter, and the information associated with the prefix range Bloom filter (block 440). For example, network device 210 may store the routing table information, the prefix length Bloom filter information, and the prefix range Bloom filter information. In some implementations, network device 210 may store the routing table information, the prefix length Bloom filter information, and the prefix range Bloom filter information when network device 210 receives and/or determines the routing table information, the prefix length Bloom filter information, and the prefix range Bloom filter information. Additionally, or alternatively, network device 210 may store the routing table information, the prefix length Bloom filter information, and the prefix range Bloom filter information based on receiving information indicating that network device 210 is to store the routing table information, the prefix length Bloom filter information, and the prefix range Bloom filter information.

In some implementations, network device 210 may store the routing table information, the prefix length Bloom filter information, and the prefix range Bloom filter information in one or more memory devices (e.g., a RAM, a ROM, a cache, a hard disk, etc.) of network device 210. Additionally, or alternatively, network device 210 may provide the routing table information, the prefix length Bloom filter information, and the prefix range Bloom filter information to another device for storage.

In some implementations, network device 210 may store the routing table information, the prefix length Bloom filter information, and the prefix range Bloom filter information such that previous routing table information, previous prefix length Bloom filter information, and/or previous prefix range Bloom filter information (e.g., received and/or determined at an earlier time) are overwritten and/or deleted. Additionally, or alternatively, network device 210 may store the routing table information, the prefix length Bloom filter information, and the prefix range Bloom filter information such that network device 210 may retrieve the routing table information, the prefix length Bloom filter information, and the prefix range Bloom filter information at a later time.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
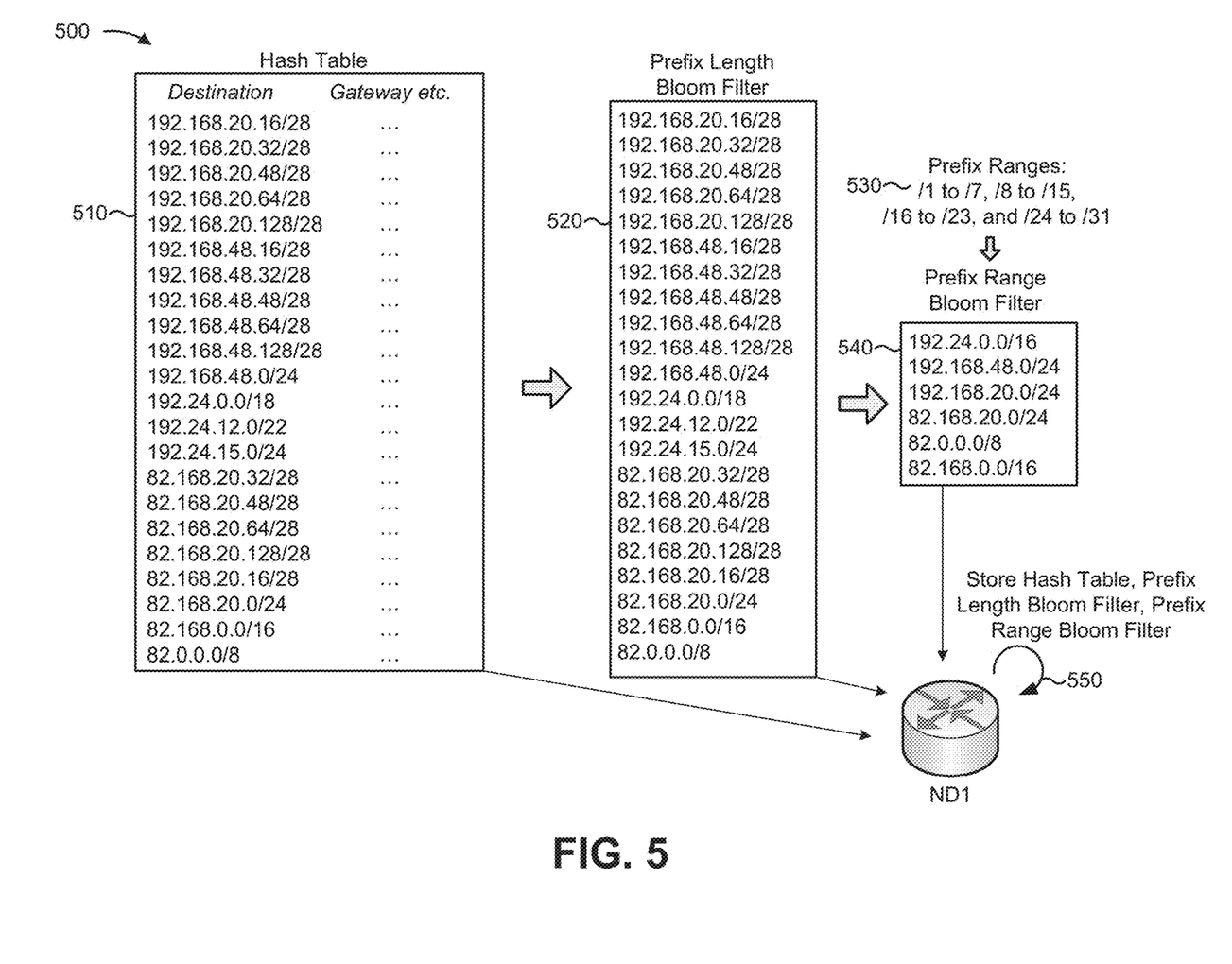
FIG. 5 is a diagram of an example implementation relating to the example process shown in FIG. 4.

FIG. 5 is a diagram of an example implementation 500 relating to example process 400 shown in FIG. 4. For the purposes of example implementation 500, assume that network device 210 (e.g., ND1) is positioned to receive and/or provide packets from and/or to one or more other network devices 210 associated with network 220.

As shown in FIG. 5, and by reference number 510, ND1 may receive (e.g., based on user input, based on a network topology discovery procedure, etc.) routing table information (e.g., in the form of a hash table) that includes a set of network address and other routing information associated with network 220 (e.g., a set of gateway addresses corresponding to each destination network address, etc.). As shown by reference number 520, ND1 may determine, based on the information included in the hash table, prefix length Bloom filter information associated with the hash table. As shown, the prefix length Bloom filter, described by the prefix length Bloom filter information, may include a set of entries that correspond to each network address included in the hash table.

As shown by reference number 530, assume that ND1 is configured to determine prefix range Bloom filter information, associated with four prefix ranges (e.g., /1 to /7, /8 to /15, /16 to /23, and /24 to /31), based on a smallest prefix associated with each prefix range (e.g., /1, /8, /16, and /24). As shown by reference number 540, ND1 may determine prefix range Bloom filter information based on the prefix length entries included in the prefix length Bloom filter (e.g., 192.24.0.0/16, 192.168.48.0/24, 192.168.20.0/24, 82.168.20.0/24, 82.0.0.0/8, and 82.168.0.0/16). Notably, as shown, the quantity of prefix range Bloom filter entries is less than the quantity of prefix length Bloom filter entries. In this example, the /1 prefix range and the /8 prefix range may be disabled (e.g., such that ND1 will not probe the prefix range Bloom filter for /1 prefix range entry or a /8 prefix range entry). Moreover, as shown, the /8 prefix range entry encompasses the prefix length entry with the /8 prefix; the /16 prefix range entries encompass the prefix length entries with the /16 prefix, the /18 prefix, and the /22 prefix; and the /24 prefix range entries encompass the prefix length entries with the /24 prefix and the /28 prefix.

As shown by reference number 550, ND1 may store the hash table, the prefix length Bloom filter information, and the prefix range Bloom filter information (e.g., such that ND1 may perform a long prefix match network address lookup at a later time). ND1 may implement such a two-stage Bloom filter in order to perform a longest prefix match network address lookup with improved lookup performance, as described below (e.g., as opposed to employing only the prefix length Bloom filter).

As indicated above, s provided merely as an example. Other examples are possible and may differ from what was described with regard to FIG. 5.

Figure 6:
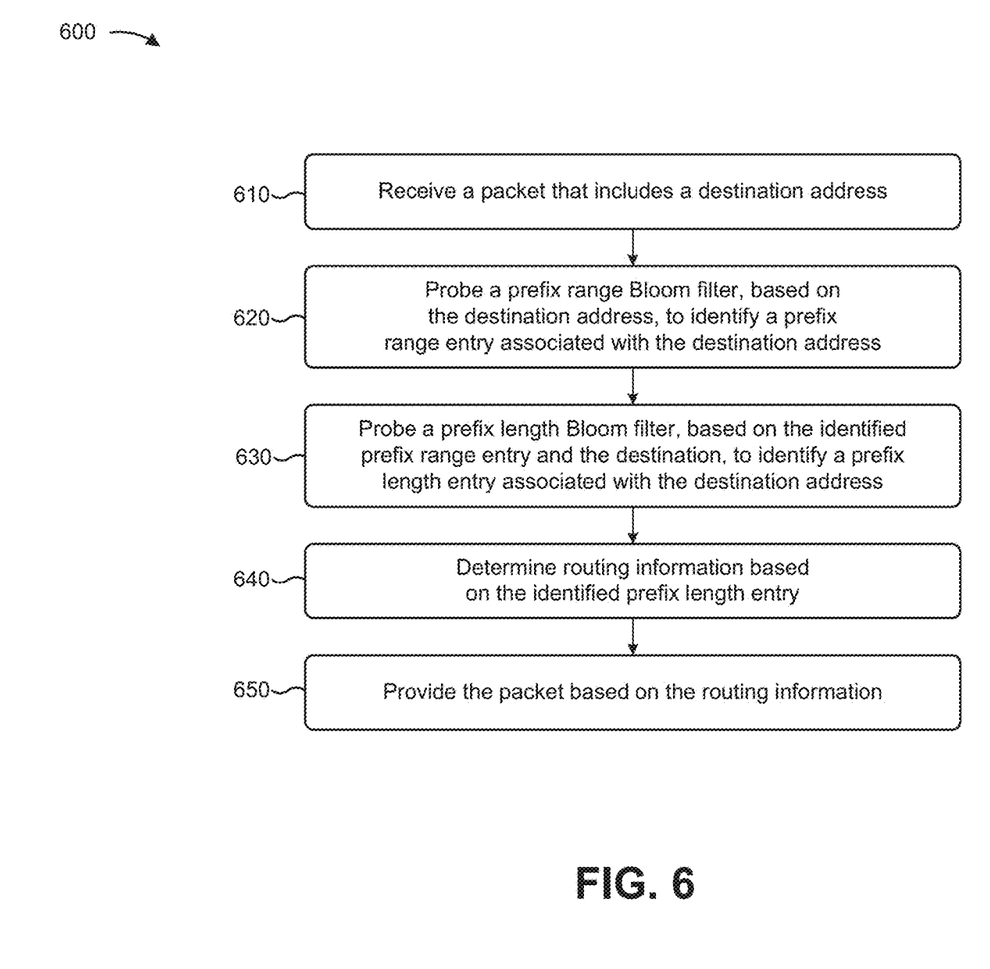
FIG. 6 is a flow chart of an example process for identifying, using a prefix length Bloom filter and a prefix range Bloom filter, a routing table entry, associated with a packet, and providing the packet based on information included in the routing table entry.

FIG. 6 is a flow chart of an example process 600 for identifying, using a prefix length Bloom filter and a prefix range Bloom filter, a routing table entry, associated with a packet, and providing the packet based on information included in the routing table entry. In some implementations, one or more process blocks of FIG. 6 may be performed by network device 210.

As shown in FIG. 6, process 600 may include receiving a packet that includes a destination network address (block 610). For example, network device 210 may receive a packet that includes a destination network address. In some implementations, network device 210 may receive the packet when another device (e.g., another network device 210) provides the packet.

In some implementations, the packet may include a destination address that identifies a particular device to which the packet is to be provided. In some implementations, network device 210 may determine, based on performing a longest prefix match lookup using a two-stage Bloom filter associated with the destination address (e.g., as described below), a network address that identifies another network device 210 (e.g., a next hop, a gateway, etc.) on a network route leading to the particular device.

As further shown in FIG. 6, process 600 may include probing a prefix range Bloom filter, based on the destination address, to identify a prefix range entry associated with the destination address (block 620). For example, network device 210 may probe a prefix range Bloom filter, based on the destination address, to identify a prefix range entry associated with the destination address. In some implementations, network device 210 may probe the prefix range Bloom filter after network device 210 receives the packet. Additionally, or alternatively, network device 210 may probe the prefix range Bloom filter when network device 210 receives information indicating that network device 210 is to probe the prefix range Bloom filter.

In some implementations, network device 210 may probe the prefix range Bloom filter based on the destination address. For example, assume that network device 210 has received a packet that includes a destination address (e.g., 192.168.20.16), and that network device 210 stores or has access to a prefix range Bloom filter that includes a set of prefix range entries e.g., 192.168.0.0/16, 82.168.0.0/16, 192.24.0.0/16, 192.168.48.0/24, 192.168.20.0/24, 82.168.20.0/24) associated with a set of prefix ranges (e.g., /1 to /7, /8 to /15/, /16 to /23, and /24 to /31). In this example, network device 210 may probe the prefix range Bloom filter by generating, based on the prefix ranges beginning at /16 and /24 (e.g., associated with the prefix ranges enabled in the prefix range Bloom filter) a set of prefix range probes. Here, network device 210 may generate a first prefix range probe to check for the existence of a 192.168.20.0/24 prefix range entry in the prefix range Bloom filter, and may generate a second prefix range probe to check for the existence of a 192.168.0.0/16 prefix range entry in the prefix range Bloom filter (e.g., assume that the /1 prefix range and the /8 prefix range are disabled such that network device 210 does not generate prefix range probes associated with those prefix ranges). Here, based on probing the prefix range Bloom filter, network device 210 may determine that the prefix range Bloom filter includes a prefix range entry matching 192.168.20.0/24 (e.g., assume that there are no false positives). In this way, network device 210 may probe a prefix range Bloom filter in order to identify a prefix range entry associated with a destination address.

As further shown in FIG. 6, process 600 may include probing a prefix length Bloom filter, based on the identified prefix range entry and the destination address, to identify a prefix length associated with the destination address (block 630). For example, network device 210 may probe a prefix length Bloom filter, based on the identified prefix range entry and the destination address, to identify a prefix length associated with the destination address. In some implementations, network device 210 may probe the prefix length Bloom filter after network device 210 probes the prefix range Bloom filter. Additionally, or alternatively, network device 210 may probe the prefix length Bloom filter after network device 210 identifies the prefix range entry associated with the destination address. Additionally, or alternatively, network device 210 may probe the prefix length Bloom filter when network device 210 receives information indicating that network device 210 is to probe the prefix length Bloom filter.

In some implementations, network device 210 may probe the prefix length Bloom filter based on the identified prefix range entry and the destination address. For example, continuing with the example described above, assume that network device 210 identifies a prefix range entry of 192.168.20.0/24 associated with a destination address of 192.168.20.16. Further, assume that network device 210 stores a prefix length Bloom filter that includes a set of prefix length entries (e.g., 192.168.20.16/28, 192.168.48.0/24, 192.168.0.0/16, 192.24.0.0/18, 192.24.12.0/22, 82.168.20.16/28, 82.168.20.0/24, and 82.168.0.0/16) Finally, assume that the prefix range Bloom filter includes information indicating that only a /24 prefix length and a /28 prefix length, associated with the /24 to /31 prefix range, are to be probed (e.g., since the prefix length Bloom filter includes network addresses for only a /24 prefix length and a /28 prefix length within the /24 to /31 prefix range). In this example, network device 210 may probe the prefix length Bloom filter by generating, based on the prefix lengths included in the prefix lengths Bloom filter (e.g., /24 and /28), a set of prefix length probes. Here, network device 210 may generate a prefix length probe to check for the existence of a 192.168.20.16/28 prefix length entry in the prefix length Bloom filter, and may generate a second prefix length probe to check for the existence of a 192.168.20.0/24 prefix length entry in the prefix length Bloom filter (e.g., assume that network device 210 does not generate prefix length probes for other prefix lengths, included in the /24 prefix range, since the prefix length Bloom filter does not include prefix length entries associated with the other prefix lengths). Here, based on probing the prefix length Bloom filter, network device 210 may determine that the prefix length Bloom filter includes a prefix length entry matching 192.168.20.16/28 (e.g., assume that there are no false positives). In this way, network device 210 may probe a prefix length Bloom filter in order to identify a prefix length entry associated with a destination address.

Notably, in this example, the quantity of entries in the prefix range Bloom filter is small relative to the quantity of entries included in the prefix length Bloom filter. As such, the implementation of the prefix range Bloom filter may help direct the lookup in the prefix length Bloom filter (e.g., by not requiring ND1 to probe every possible prefix length included in the prefix length Bloom filter).

As further shown in FIG. 6, process 600 may include determining routing information based on the identified prefix length entry (block 640). For example, network device 210 may determine routing information based on the identified prefix length entry. In some implementations, network device 210 may determine the routing information after network device 210 probes the prefix length Bloom filter. Additionally, or alternatively, network device 210 may determine the routing information after network device 210 identifies the prefix length entry associated with the destination address. Additionally, or alternatively, network device 210 may determine the routing information when network device 210 receives information indicating that network device 210 is to determine the routing information.

In some implementations, network device 210 may determine the routing information based on a routing table stored or accessible by network device 210. For example, network device 210 may store a routing table that includes a set of routing table entries that correspond to a set of prefix length entries included in the prefix length Bloom filter. In this example, after network device 210 identifies the prefix length entry associated with the destination address, network device 210 may identify a routing table entry corresponding to the prefix length entry, and may determine the routing information based on the routing table entry. In some implementations, the routing information may include information (e.g., an IP address) that identifies another device (e.g., another network device 210, etc.) to which the packet is to be provided and/or other information associated with routing the packet to the destination address.

In some implementations, network device 210 may be unable to determine the routing information based on the prefix length entry, and network device 210 may perform another iteration of one or more process blocks of process 600. For example, network device 210 may identify a first prefix length entry, associated with the destination address, based on probing the prefix length Bloom filter, as described above. However, in some cases, the routing table may not include a routing table entry corresponding to the first prefix length entry (e.g., when probing the prefix length Bloom filter returns a false positive). In this example, network device 210 may then determine, based on probing the prefix length Bloom filter, a second prefix length entry (e.g., a prefix length entry with a next longest prefix), associated with the destination address, and may determine the routing information based on the second prefix length entry (i.e., network device 210 may determine routing information, included in the routing table, that corresponds to the second prefix length entry). In a case where network device 210 has probed the prefix length Bloom filter for all prefix lengths associated with an identified prefix range entry when there are no other prefix lengths to probe within the prefix range), network device 210 may identify another prefix range entry (e.g., a prefix range entry with a next longest prefix) in the manner described above, and may proceed with identifying one or more prefix length entries associated with the other prefix range. In this way, network device 210 may perform multiple iterations of process 600 in order to determine the routing information associated with the destination address.

As further shown in FIG. 6, process 600 may include providing the packet based on the routing information (block 650). For example, network device 210 may provide the packet based on the routing information. In some implementations, network device 210 may provide the packet after network device 210 determines the routing information. Additionally, or alternatively, network device 210 may provide the packet when network device 210 determines that network device 210 is to provide the packet. Additionally, or alternatively, network device 210 may provide the packet at another time.

In some implementations, network device 210 may provide the packet based on the routing information. For example, the routing information may include a network address that identifies another network device 210 to which the packet is to be provided, and network device 210 may provide the packet to the other network device 210 accordingly. In some implementations, the above process may be repeated at the other network device 210 (e.g., and at each network device 210 along the route that the packet travels to the destination address).

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
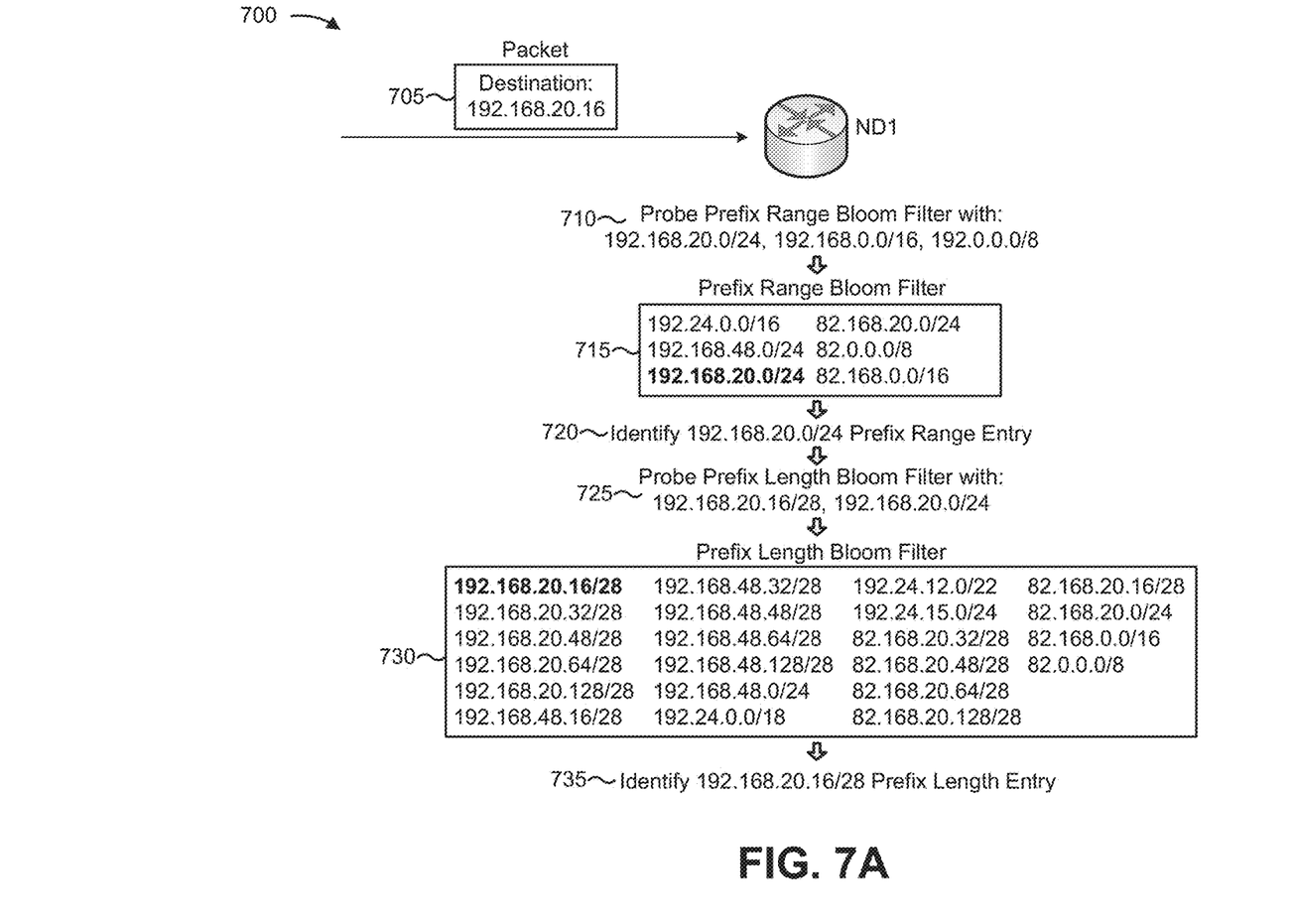
FIGS. 7A and 7B are diagrams of an example implementation relating to the example process shown in FIG. 6.
Figure 7B:
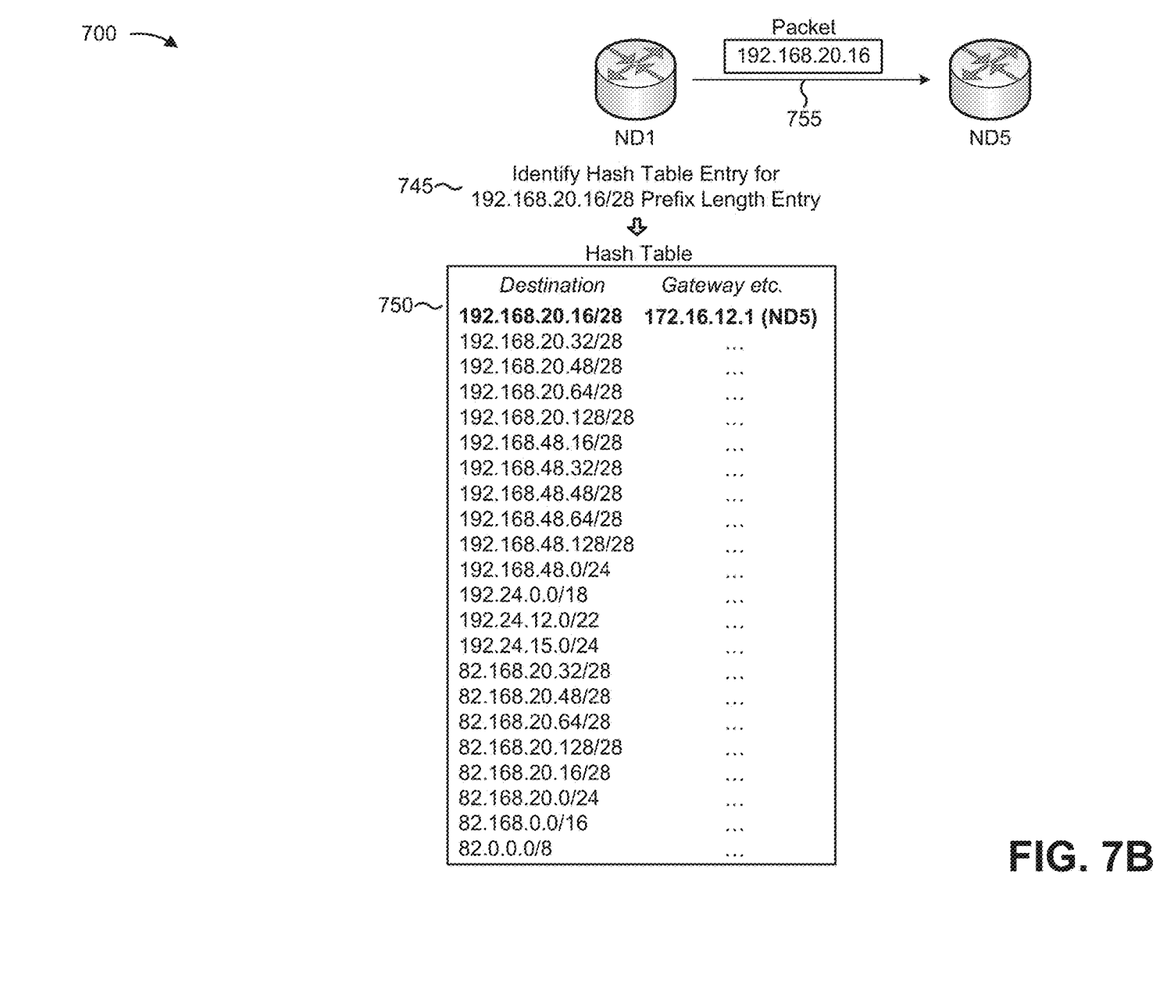

FIGS. 7A and 7B are diagrams of an example implementation 700 relating to example process 600 shown in FIG. 6. For the purposes of example implementation 700, assume that network device 210 (e.g., ND1) stores information associated with a routing table, information associated with a prefix length Bloom filter, and information associated with a prefix range Bloom filter, as described above with regard to example implementation 500.

As shown in FIG. 7A, and by reference number 705, ND1 may receive (e.g., from another network device 210) a packet that includes a destination address (e.g., 192.68.20.16). As shown by reference number 710, ND1 may generate a set of prefix range probes. In some implementations, ND1 may generate the set of prefix range probes based on the lowest prefix associated with each prefix range and the destination address. Here, ND1 generates a set of prefix range probes that includes 192.168.20.0/24, 192.168.0.0/16, and 192.0.0.0/8 (e.g., corresponding to the lowest prefix included in each prefix range enabled in the prefix range Bloom filter). As shown, ND1 may probe the prefix range Bloom filter in order to determine whether the prefix range Bloom filter includes prefix range entries that match the set of prefix range probes (e.g., assume that the /1 prefix range is disabled). As shown by reference number 715, ND1 may determine that the prefix range Bloom filter includes a prefix range envy that matches the 192.168.20.0/24 prefix range probe and, as shown, by reference number 720 may identify the 192.168.20.0/24 prefix range entry as being associated with the destination address.

As shown by reference number 725, ND1 may generate, based on the identified prefix range entry, a set of prefix length probes. In some implementations, ND1 may generate the set of prefix length probes based on one or more prefix lengths included in the prefix range and based on the destination address. Here, ND1 generates a set of prefix length probes that includes 192.168.20.0/24 and 192.168.20.15/28 (e.g., corresponding to prefixes enabled in the prefix length Bloom filter). As shown, ND1 may probe the prefix length Bloom filter in order to determine whether the prefix length Bloom filter includes prefix length entries that match the set of prefix length probes (e.g., assume that ND1 probes only those prefix lengths, /24 and /28, known to be included in the prefix length Bloom filter). As shown by reference number 730, ND1 may determine that the prefix length Bloom filter includes a prefix length entry that matches the 192.168.20.16/28 prefix length probe and, as shown, by reference number 735 may identify the 192.168.20.16/28 prefix length entry as a longest prefix match associated with the destination address.

As shown in FIG. 7B, and by reference number 745, ND1 may identify a hash table entry, included in a hash table stored by ND1, based on the 192.168.20.16/28 prefix length entry identified as the longest prefix match for the destination address. As shown by reference number 750, the hash table entry corresponding to the prefix length entry may include information that identifies another network device 210 (e.g., a network address of 172.16.12.1 that identifies ND5) to which the packet is to be provided. As shown by reference number 755, ND1 may provide the packet to ND5 based on the network address included in the hash table entry.

As indicated above, FIGS. 7A and 7B are provided merely as an example. Other examples are possible and may differ from what was described with regard to FIGS. 7A and 7B.

Implementations described herein may allow a network device to identify a longest prefix match, associated with a network address, using a two-stage Bloom filter for improved lookup performance.

The foregoing disclosure provides illustration and description, but is not intended to be exhaustive or to limit the implementations to the precise form disclosed. Modifications and variations are possible in light of the above disclosure or may be acquired from practice of the implementations. For example, while the processes and/or methods described herein are described in the context of IPv4 addresses for simplicity, these processes and/or methods may equally apply in the context of IPv6 addresses.

As used herein, the term component is intended to be broadly construed as hardware, firmware, and/or a combination of hardware and software.

As used herein, a packet may refer to a network packet, a frame, a datagram, a segment, a fragment of a packet, a fragment of a frame, a fragment of a datagram, a fragment of a segment, or any other formatted or unformatted unit of data capable of being transmitted via a network.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item s intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method comprising:
   determining, by a network device, first information regarding a first Bloom filter,
      the first Bloom filter including a set of prefix range entries;
   determining, by the network device, second information regarding a second Bloom filter associated with the first Bloom filter,
      the second Bloom filter including a set of prefix length entries,
      a prefix range entry, of the set of prefix range entries, comprising a lowest prefix of a prefix range, and encompassing a plurality of prefix length entries of the set of prefix length entries, and
      a first quantity of entries of the set of prefix range entries being less than a second quantity of entries of the set of prefix length entries; and
   storing or providing, by the network device and for routing of a packet, the first information regarding the first Bloom filter and the second information regarding the second Bloom filter.

2. The method of claim 1, where determining the first information regarding the first Bloom filter comprises:
   determining the first information regarding the first Bloom filter based on information from a routing table.

3. The method of claim 1, where determining the second information regarding the second Bloom filter comprises:
   determining the second information regarding the second Bloom filter based on information from a routing table.

4. The method of claim 1, further comprising:
   receiving the packet,
      the packet comprising a destination network address;
   probing, based on the destination network address, the first Bloom filter to identify another prefix range entry, of the set of prefix range entries, associated with the destination network address;
   probing, based on the other prefix range entry and the destination network address, the second Bloom filter to identify a prefix length entry, of the set of prefix length entries, associated with the destination network address;
   determining routing information based on the identified prefix length entry; and
   providing the packet based on the routing information.

5. The method of claim 4, further comprising:
   generating a set of prefix range probes; and
   where probing the first Bloom filter comprises:

probing the first Bloom filter based on the set of prefix range probes.

6. The method of claim 4, where determining the routing information based on the identified prefix length entry comprises:
identifying a hash table entry corresponding to the prefix length entry; and
determining the routing information based on the hash table entry.

7. The method of claim 1, further comprising:
generating a prefix range probe based on the lowest prefix of the prefix range.

8. A computer-readable medium storing instructions, the instructions comprising:
one or more instructions that, when executed by one or more processors, cause the one or more processors to:
determine first information regarding a first Bloom filter,
the first Bloom filter including a set of prefix range entries;
determine second information regarding a second Bloom filter associated with the first Bloom filter,
the second Bloom filter including a set of prefix length entries,
a prefix range entry, of the set of prefix range entries, comprising a lowest prefix of a prefix range, and encompassing a plurality of prefix length entries of the set of prefix length entries, and
a first quantity of entries of the set of prefix range entries being less than a second quantity of entries of the set of prefix length entries; and
store or provide, for routing of a packet, the first information regarding the first Bloom filter and the second information regarding the second Bloom filter.

9. The computer-readable medium of claim 8, where the one or more instructions, that cause the one or more processors to determine the first information regarding the first Bloom filter, are to:
determine the first information regarding the first Bloom filter based on information from a routing table.

10. The computer-readable medium of claim 8, where the one or more instructions, that cause the one or more processors to determine the second information regarding the second Bloom filter, are to:
determine the second information regarding the second Bloom filter based on information from a routing table.

11. The computer-readable medium of claim 8, where the one or more instructions, when executed by the one or more processors, further cause the one or more processors to:
receive the packet,
the packet comprising a destination network address;
probe, based on the destination network address, the first Bloom filter to identify another prefix range entry, of the set of prefix range entries, associated with the destination network address;
probe, based on the other prefix range entry and the destination network address, the second Bloom filter to identify a prefix length entry, of the set of prefix length entries, associated with the destination network address;
determine routing information based on the identified prefix length entry; and
provide the packet based on the routing information.

12. The computer-readable medium of claim 11, where the one or more instructions, when executed by the one or more processors, further cause the one or more processors to:
generate a set of prefix range probes; and
where the one or more instructions, that cause the one or more processors to probe the first Bloom filter, are to:
probe the first Bloom filter based on the set of prefix range probes.

13. The computer-readable medium of claim 11, where the one or more instructions, that cause the one or more processors to determine the routing information based on the identified prefix length entry, are to:
identify a hash table entry corresponding to the prefix length entry; and
determine the routing information based on the hash table entry.

14. The computer-readable medium of claim 8, where the one or more instructions, when executed by the one or more processors, further cause the one or more processors to:
generate a prefix range probe based on the lowest prefix of the prefix range.

15. A device, comprising:
a memory; and
one or more processors to:
determine first information regarding a first Bloom filter,
the first Bloom filter including a set of prefix range entries;
determine second information regarding a second Bloom filter associated with the first Bloom filter,
the second Bloom filter including a set of prefix length entries,
a prefix range entry, of the set of prefix range entries, comprising a lowest prefix of a prefix range, and encompassing a plurality of prefix length entries of the set of prefix length entries, and
a first quantity of entries of the set of prefix range entries being less than a second quantity of entries of the set of prefix length entries; and
store or provide, for routing of a packet, the first information regarding the first Bloom filter and the second information regarding the second Bloom filter.

16. The device of claim 15, where the one or more processors, when determining the first information regarding the first Bloom filter, are to:
determine the first information regarding the first Bloom filter based on information from a routing table.

17. The device of claim 15, where the one or more processors, when determining the second information regarding the second Bloom filter, are to:
determine the second information regarding the second Bloom filter based on information from a routing table.

18. The device of claim 15, where the one or more processors are further to:
receive the packet,
the packet comprising a destination network address;
probe, based on the destination network address, the first Bloom filter to identify another prefix range entry, of the set of prefix range entries, associated with the destination network address;
probe, based on the other prefix range entry and the destination network address, the second Bloom filter to identify a prefix length entry, of the set of prefix length entries, associated with the destination network address;

determine routing information based on the identified prefix length entry; and provide the packet based on the routing information.

19. The device of claim 18, where the one or more processors are further to:

generate a set of prefix range probes; and where the one or more processors, when probing the first Bloom filter, are to:

probe the first Bloom filter based on the set of prefix range probes.

20. The device of claim 18, where the one or more processors, when determining the routing information based on the identified prefix length entry, are to:

identify a hash table entry corresponding to the prefix length entry; and determine the routing information based on the hash table entry.

\* \* \* \* \*